(12) United States Patent
Wu et al.

(10) Patent No.: US 6,801,653 B1
(45) Date of Patent: Oct. 5, 2004

(54) INFORMATION PROCESSING APPARATUS AND METHOD AS WELL AS MEDIUM

(75) Inventors: Weiguo Wu, Tokyo (JP); Teruyuki Ushiro, Chiba (JP); Takayuki Yoshigahara, Tokyo (JP); Atsushi Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 09/626,823

(22) Filed: Jul. 27, 2000

(30) Foreign Application Priority Data

Aug. 5, 1999  (JP) .......................................... P11-221918

(51) Int. Cl.[7] .............................. G06K 9/00; G06K 9/68; G06K 9/64
(52) U.S. Cl. ........................ 382/154; 382/218; 382/278
(58) Field of Search ................................ 382/154, 195, 382/199, 209, 218, 217, 278, 286, 293, 307, 308; 375/240.03, 240

(56) References Cited

U.S. PATENT DOCUMENTS

| | | | | |
|---|---|---|---|---|
| 5,832,115 A | * | 11/1998 | Rosenberg | 382/199 |
| 5,978,507 A | * | 11/1999 | Shackleton et al. | 382/195 |
| 6,081,551 A | * | 6/2000 | Etoh | 375/240 |
| 6,088,392 A | * | 7/2000 | Rosenberg | 375/240.03 |
| 6,483,949 B1 | * | 11/2002 | Yokoyama et al. | 382/278 |
| 6,519,358 B1 | * | 2/2003 | Yokoyama et al. | 382/154 |

OTHER PUBLICATIONS

Lucas et al, "An Iterative Image Registration Technique with Application to Stereo Vision", Apr. 1981, Proceedings of DARPA Image Understanding Workshop, pp. 121–130.*
U.S. patent application Ser. No. 09/168,055, filed Oct. 7, 1998, now U.S. patent application 6,519,358.
U.S. patent application Ser. No. 09/174,382, filed Oct. 16, 1998, abandoned.
U.S. patent application Ser. No. 09/365,049, filed Jul. 30, 1999, now U.S. patent application 6,483,949.

* cited by examiner

Primary Examiner—Mehrdad Dastouri
(74) Attorney, Agent, or Firm—Bell, Boyd & Lloyd LLC

(57) ABSTRACT

The invention provides an image processing apparatus and method as well as a medium by which a corresponding point can be found out and matching between images can be performed with a higher degree of accuracy. A template deformation section produces a plurality of deformed templates by linear interpolation from a template inputted thereto from a template setting section and inputs the deformed templates to a plurality of matching operation sections. The matching operation sections use an image of an epipolar line from among reference images stored in image memories and the deformed templates to perform template matching on the epipolar line. Selection sections determine one of the deformed templates which exhibits the highest similarity degree from results of the template matching and determine coordinate values then as a parallax.

6 Claims, 14 Drawing Sheets

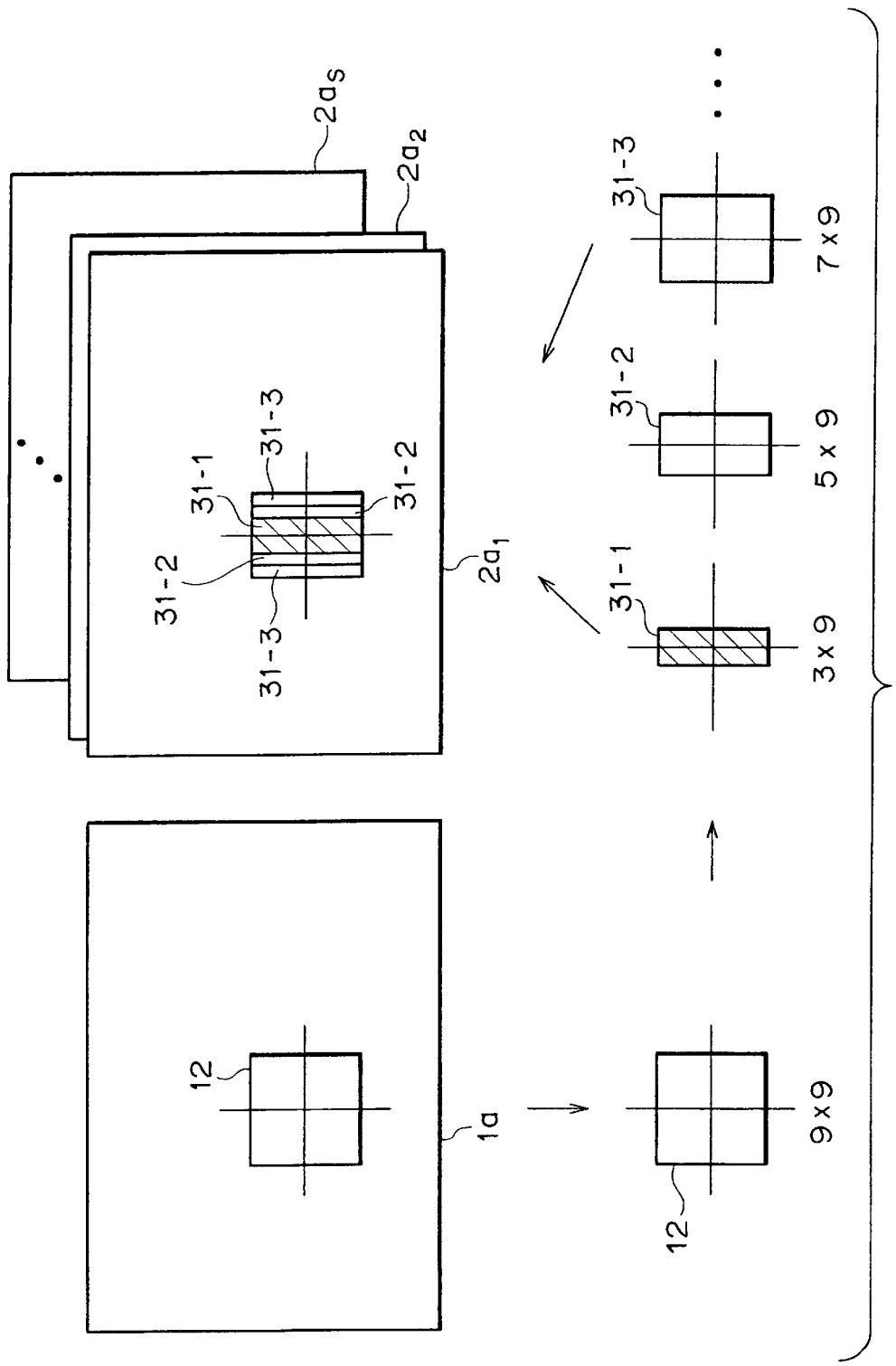

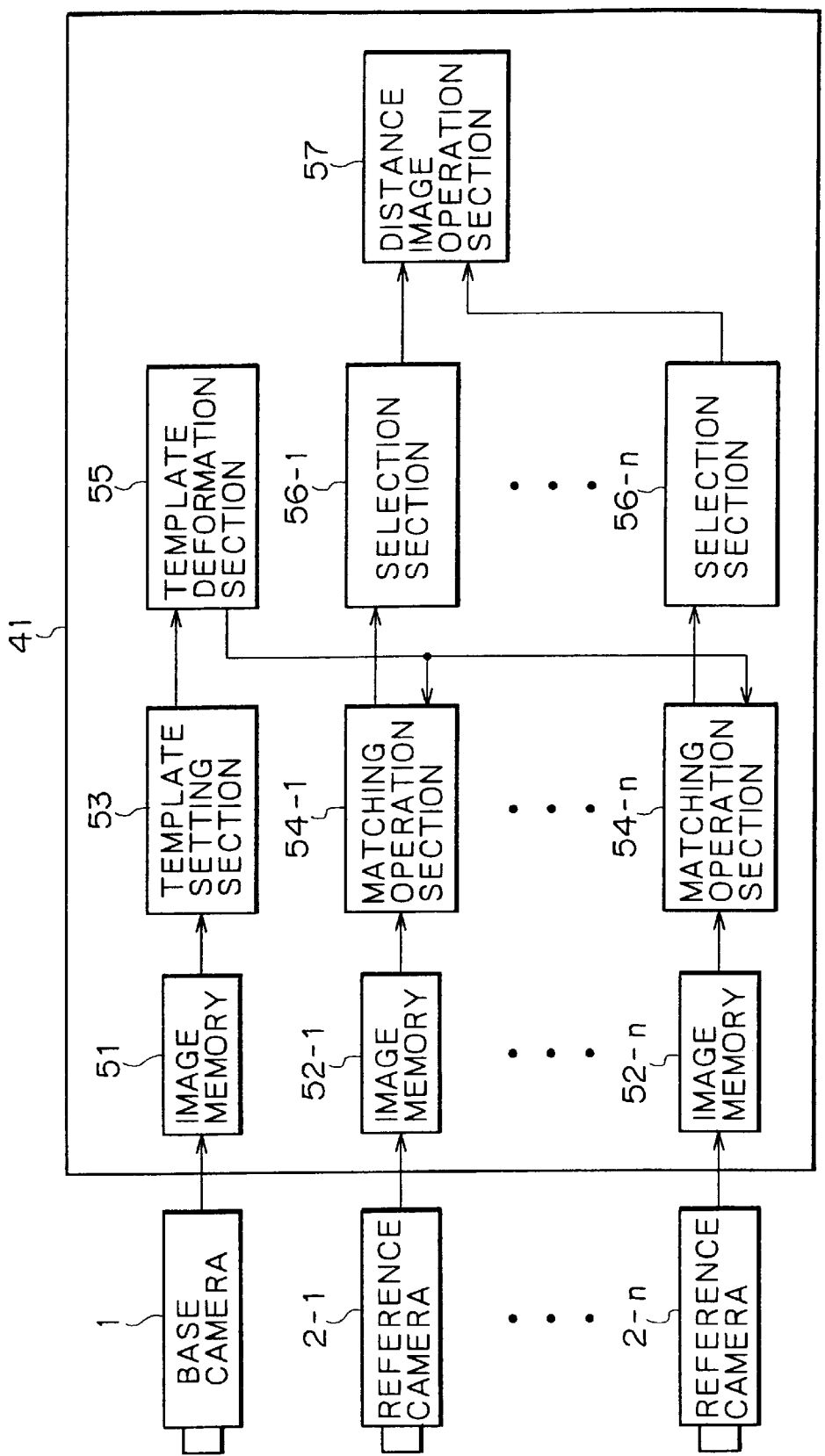

FIG. 8

| ANGLE OF SLOPE | WINDOW SIZE | | | | | | | | |
|---|---|---|---|---|---|---|---|---|---|
| | 3×3 | 5×5 | 7×7 | 9×9 | 11×11 | 13×13 | 15×15 | 17×17 | 19×19 |
| 15 | 0.132 | 0.219 | 0.307 | 0.395 | 0.483 | 0.571 | 0.659 | 0.747 | 0.835 |
| 30 | 0.291 | 0.496 | 0.681 | 0.875 | 1.07 | 1.266 | 1.461 | 1.657 | 1.853 |
| 45 | 0.524 | 0.875 | 1.226 | 1.574 | 1.93 | 2.283 | 2.636 | 2.99 | 3.345 |
| 60 | 0.974 | 1.626 | 2.281 | 2.937 | 3.596 | 4.257 | 4.92 | 5.586 | 6.254 |
| 75 | 2.618 | 4.383 | 6.164 | 7.962 | 9.821 | 11.607 | 13.455 | 15.321 | 17.204 |

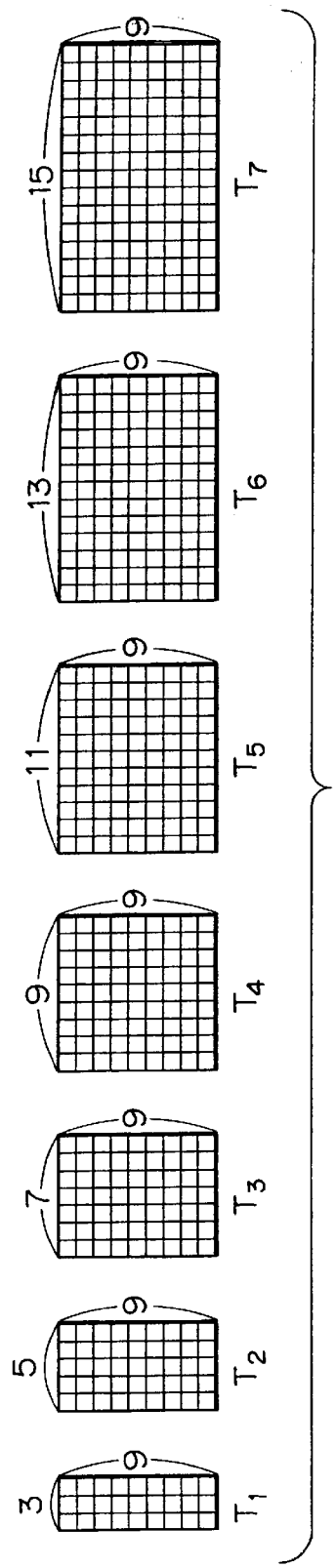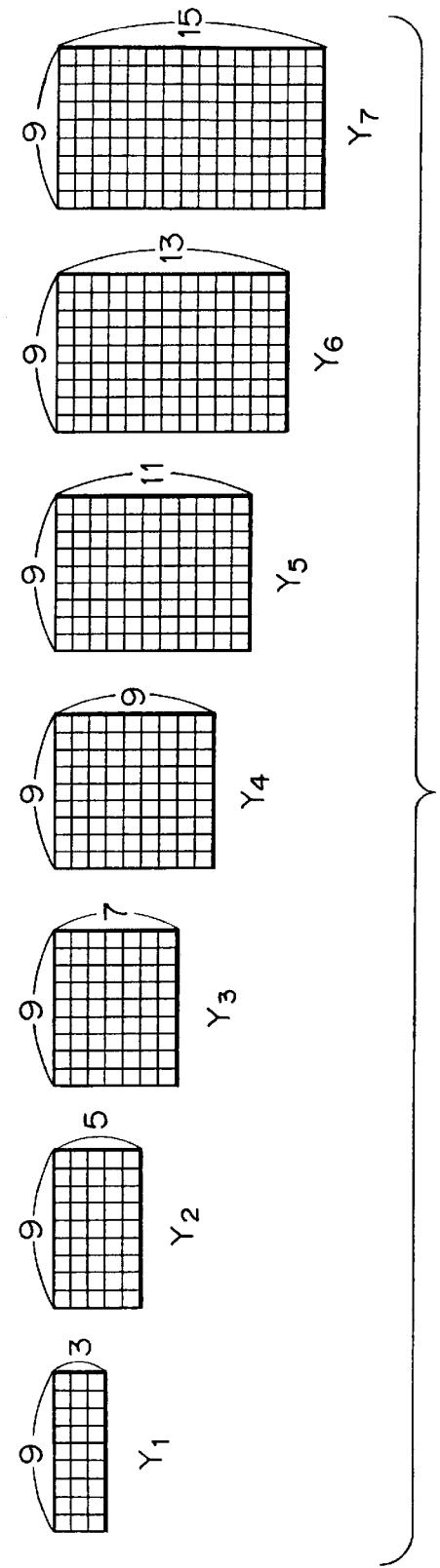
FIG. 10A
FIG. 10B

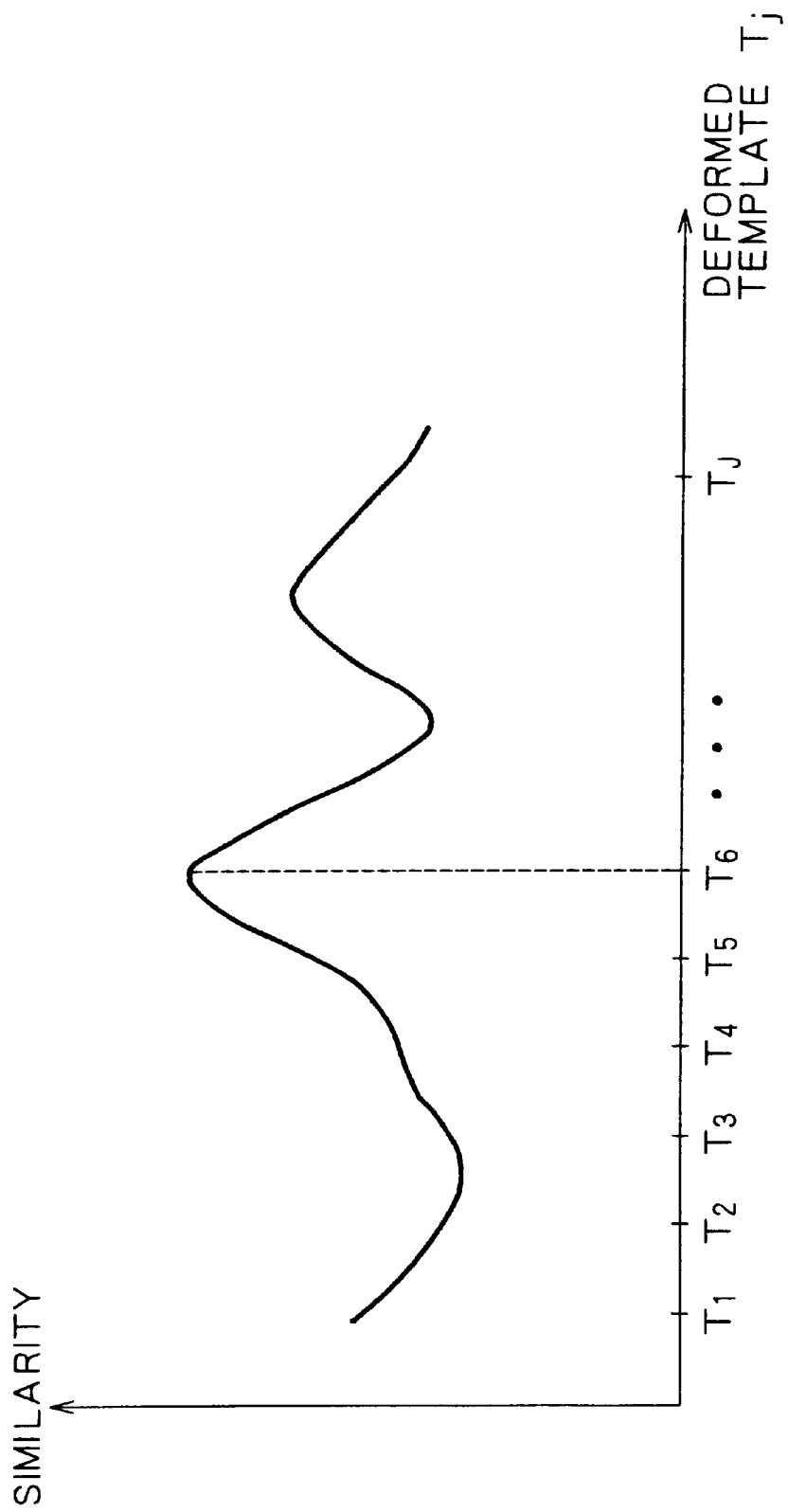

INFORMATION PROCESSING APPARATUS AND METHOD AS WELL AS MEDIUM

BACKGROUND OF THE INVENTION

This invention relates to an information processing apparatus and method as well as a medium, and more particularly to an information processing apparatus and method as well as a medium wherein matching between images is performed using a template in measuring a distance according to the stereo method.

Similarly to the principle used by a human being to sense a shape of an object or a distance from an object to a body, a stereo method is generally known as a method of measuring a distance to an object. According to the stereo method, a shape of or a distance to an object can be measured in accordance with the principle of triangulation using images observed by a plurality of cameras having different visual points from each other.

FIG. 1 illustrates the principle of the stereo method. Referring to FIG. 1, two cameras of a base camera 1 and a reference camera 2 are disposed at visual points different from each other so that a position of an object point Q to be measured in a three-dimensional space can be determined from the two cameras. In particular, an observation point $n_b$ at which the object point Q is observed on an image plane 1A of the base camera 1 and another observation point $n_r$ at which the object point Q is observed on an image plane 2A of the reference camera 2 are determined. Then, the position of the object point Q in the three-dimensional space can be determined from the two observation points $n_b$ and $n_r$.

As a technique for detecting the observation point $n_r$ corresponding to the observation point $n_b$, a method of searching for a corresponding point on an epipolar line has been proposed. For example, the observation point $n_r$ of the reference camera 2 which is a corresponding point to the observation point $n_b$ which is on the image plane 1A observed by the base camera 1 (in the following description, an image on the image plane 1A observed by the base camera 1 is referred to simply as base image 1a as seen from FIG. 2A) is present on a straight line LP along which a plane (image plane) which is defined by the optical center (optical axis) of the reference camera 2 and the observation point $n_b$ of the base camera 1 and the image plane 2A observed by the reference camera 2 (in the following description, an image on the image plane 2A observed by the reference camera 2 is referred to simply as reference image 2a as seen from FIG. 2B) intersect each other. The straight line LP is called epipolar line. Then, if the positional relationship between the base camera 1 and the reference camera 2 is known, then since the same object which is at different projection points from each other can be found, a desired corresponding point can be detected for each observation point of the base camera 1 by searching for the corresponding point on the epipolar line (straight line LP) on the reference image 2a.

As a technique for searching for a corresponding point, "pixel-based matching", "feature-based matching" and "area-based" matching are known. They have the following characteristics.

The pixel-based matching searches for a corresponding point using concentration values of individual pixels. Therefore, it is high in speed of arithmetic operation, but is low in matching accuracy.

The feature-based matching extracts a characteristic such as a concentration edge from an image and searches for a corresponding point using only the characteristic between images. Therefore, information of a distance image obtained is rough.

The area-based matching involves a kind of correlation arithmetic operation. Therefore, a high arithmetic operation cost is required. However, since a corresponding point to an object can be searched out with a high degree of accuracy and distance values of all pixels can be calculated, the area-based matching is generally used frequently.

FIGS. 2A and 2B illustrate the principle of the area-based matching. Referring to FIGS. 2A and 2B, a local window W (area) is set around a noticed point (noticed pixel) 11 set arbitrarily on an image (base image 1a) observed by the base camera 1, and the window W is set as a template 12. In FIG. 2A, the template 12 is formed from 25 pixels arranged in 5 rows×5 columns.

Then, as seen in FIG. 2B, the template 12 is disposed as a template 12A on an epipolar line 13 of an image (reference image 2a) observed by the reference camera 2, and matching is performed within the set search range and a coincidence degree R(x, y) is arithmetically operated in accordance with the following expression (1):

$$R(x, y) = \sum_{(x,y) \in W} (Im1(x, y) - Im2(x + \Delta x, y + \Delta y))^2 \qquad (1)$$

where Im1(x, y) is a pixel of the base image 1a, Im2(x+Δx, y+Δy) is a pixel of the reference image 2a, and Δx and Δy represent an amount of movement of the template 12 on the epipolar line 13. Thereafter, the template 12 is moved along the epipolar line 13 and is disposed as a template 12B. Then, similarly as for the template 12A, a coincidence degree R(x, y) is arithmetically operated in accordance with the expression (1). The template 12 is further moved along the epipolar line 13 and is disposed as a template 12C. Then, similarly as for the templates 12A and 12B, a coincidence degree R(x, y) is arithmetically operated in accordance with the expression (1).

One of the three coincidence degrees R(x, y) determined in accordance with the expression (1) above which exhibits the lowest value exhibits the highest coincidence degree (similarity degree) between the base image a 1a and the reference image 2a. Accordingly, the movement amount Δx, Δy of the template 12 when the coincidence degree R(x, y) exhibits the lowest value is determined as a parallax of the noticed point 11, and a shape or a depth of the noticed point 11 in the three-dimensional space can be calculated in accordance with the principle of triangulation using the parallax of the noticed point 11.

In this manner, in the area-based matching, three-dimensional shape data corresponding to all pixels can be obtained by repeating the matching (matching) processing for each pixel. It is to be noted that, while the coincidence degree R(x, y) of the three template 12A to template 12C in FIG. 2B are arithmetically operated in accordance with the expression (1) above, actually the template 12 is successively moved by a predetermined value within a preset search range on the epipolar line 13, and the coincidence degree R(x, y) at each of such positions is arithmetically operated.

However, whichever one of the techniques described above is used, it is difficult to accurately determine all corresponding points on an image because some "ambiguity" is involved in matching between images.

For example, if it is tried to use the area-based matching to perform matching of a texture pattern 22 on a plane 21 disposed obliquely in a three-dimensional space as shown in FIG. 3, then the texture pattern 22 observed by the two cameras of the base camera 1 and the reference camera 2 is such as shown in FIGS. 4B and 4C, respectively. In particular, FIG. 4A shows the plane 21 of FIG. 3 and the texture pattern 22 disposed on the plane 21, and FIG. 4B shows an observed image (base image 1a) when the plane 21 is observed from the base camera 1 while FIG. 4C shows an observed image (reference image 2a) when the plane 21 is observed from the reference camera 2. As can be seen from FIGS. 4A to 4C, although the left and right cameras (base camera 1 and reference camera 2) observe the same object pattern (texture pattern 22), a geometrical distortion appears between the images of the texture pattern 22 and the same object pattern is recognized as different objects. This gives rise to a problem that matching is difficult.

In order to determine a corresponding point with a higher degree of accuracy, such techniques as "local support", "matching which uses a higher-order characteristic" and "multi base line stereo" have been proposed. However, they are not sufficiently high in accuracy as yet.

SUMMARY OF THE INVENTION

It is an object of the present invention to provide an image processing apparatus and method as well as a medium by which a corresponding point can be found out with a higher degree of accuracy.

In order to attain the object described above, according to the present invention, a template is deformed to produce deformed templates, and a corresponding point is searched for using the deformed templates.

In order to attain the object described above, according to an aspect of the present invention, there is provided an image processing apparatus, comprising first inputting means for inputting at least one of images picked up by a plurality of image pickup apparatus as a base image, second inputting means for inputting the other one or ones of the images picked up by the image pickup apparatus than the base image as a reference image or images, setting means for setting an object pixel and peripheral pixels around the object pixel from among pixels of the base image as a template, production means for producing a plurality of deformed templates from the template set by the setting means, and calculation means for determining a corresponding point or points of the reference image or images using the deformed templates to calculate a corresponding relationship of the reference image or images to the base image.

According to another aspect of the present invention, there is provided an image processing method, comprising a first inputting step of inputting at least one of images picked up by a plurality of image pickup apparatus as a base image, a second inputting step of inputting the other one or ones of the images picked up by the image pickup apparatus than the base image as a reference image or images, a setting step of setting an object pixel and peripheral pixels around the object pixel from among pixels of the base image as a template, a production step of producing a plurality of deformed templates from the template set by the processing in the setting step, and a calculation step of determining a corresponding point or points of the reference image or images using the deformed templates to calculate a corresponding relationship of the reference image or images to the base image.

According to a further aspect of the present invention, there is provided a medium for causing a computer to execute a program which includes a first inputting step of inputting at least one of images picked up by a plurality of image pickup apparatus as a base image, a second inputting step of inputting the other one or ones of the images picked up by the image pickup apparatus than the base image as a reference image or images, a setting step of setting an object pixel and peripheral pixels around the object pixel from among pixels of the base image as a template, a production step of producing a plurality of deformed templates from the template set by the processing in the setting step, and a calculation step of determining a corresponding point or points of the reference image or images using the deformed templates to calculate a corresponding relationship of the reference image or images to the base image.

With the image processing apparatus, the image processing method and the medium, a plurality of deformed templates are produced, and corresponding relationships of reference images to a base image are calculated based on the deformed templates to calculate a distance to an object point. Consequently, mapping between images can be performed with a higher degree of accuracy.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a diagrammatic view illustrating a principle of an image processing method of the present invention;

FIG. 6 is a block diagram showing a construction of an image processing apparatus to which the present invention is applied;

FIG. 8 is a table illustrating results of arithmetic operation of a distance value;

FIGS. 10A and 10B are diagrammatic views showing deformed templates;

FIG. 12 is a graph illustrating a similarity degree;

DESCRIPTION OF THE PREFERRED EMBODIMENT

Figure 1:
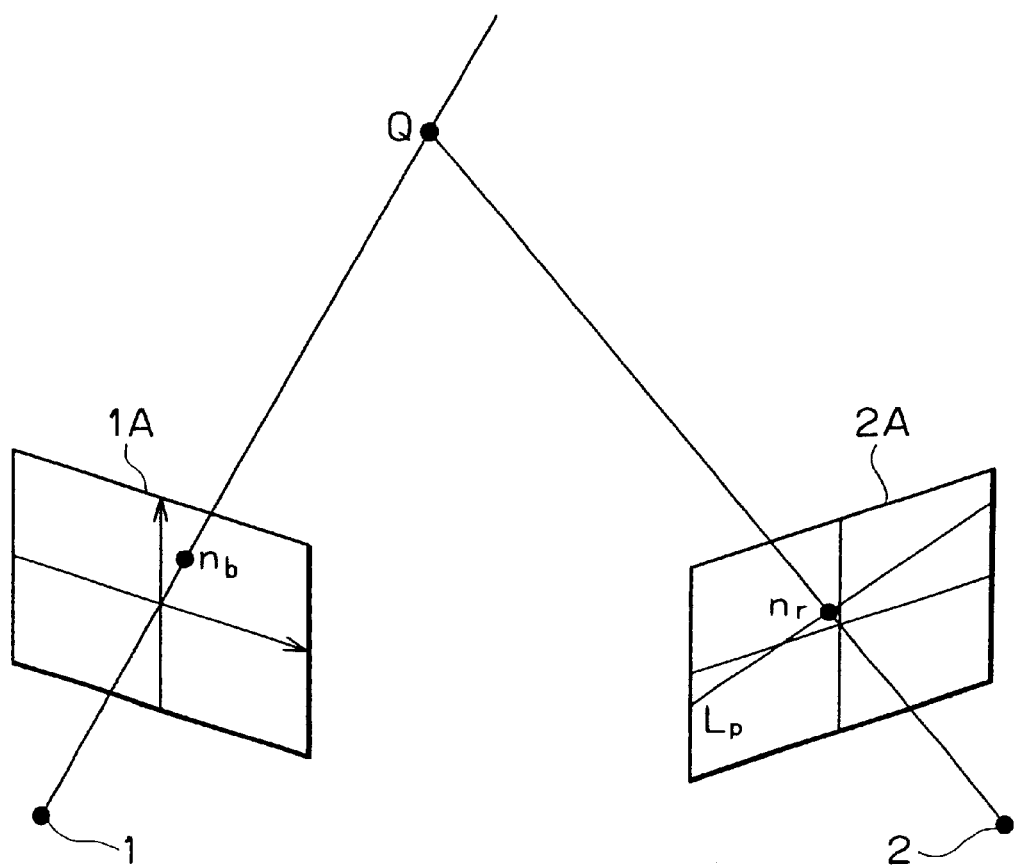
FIG. 1 is a diagrammatic view illustrating a principle of a stereo method.
Figure 2B:
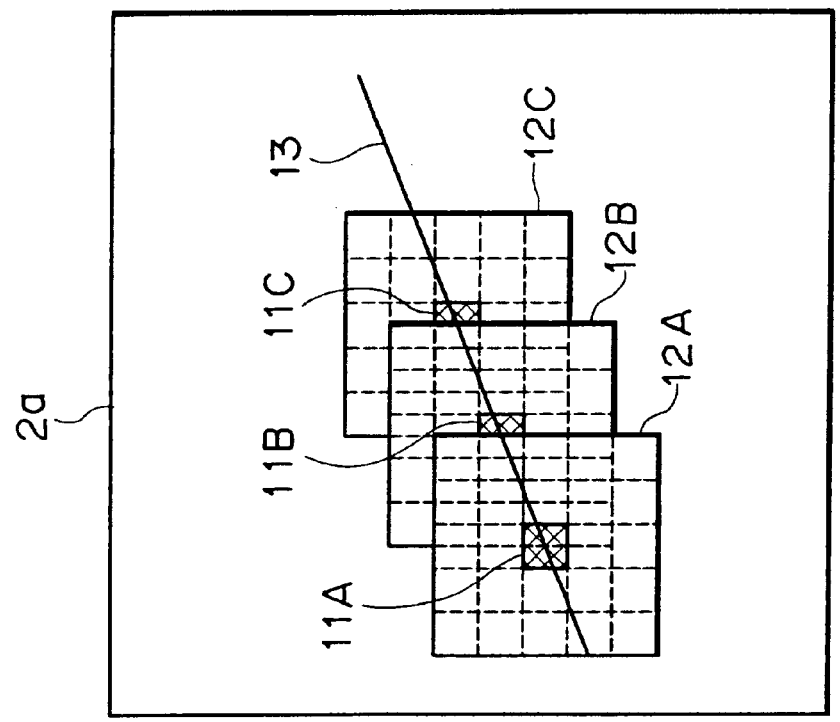
FIGS. 2A and 2B are diagrammatic views illustrating a principle of an area-based matching.
Figure 2A:
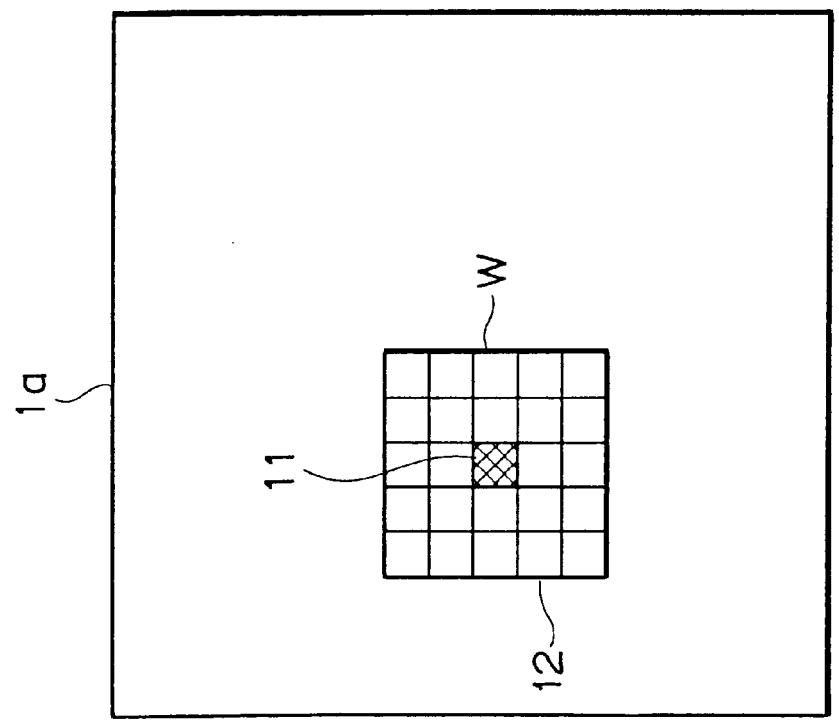
Figure 3:
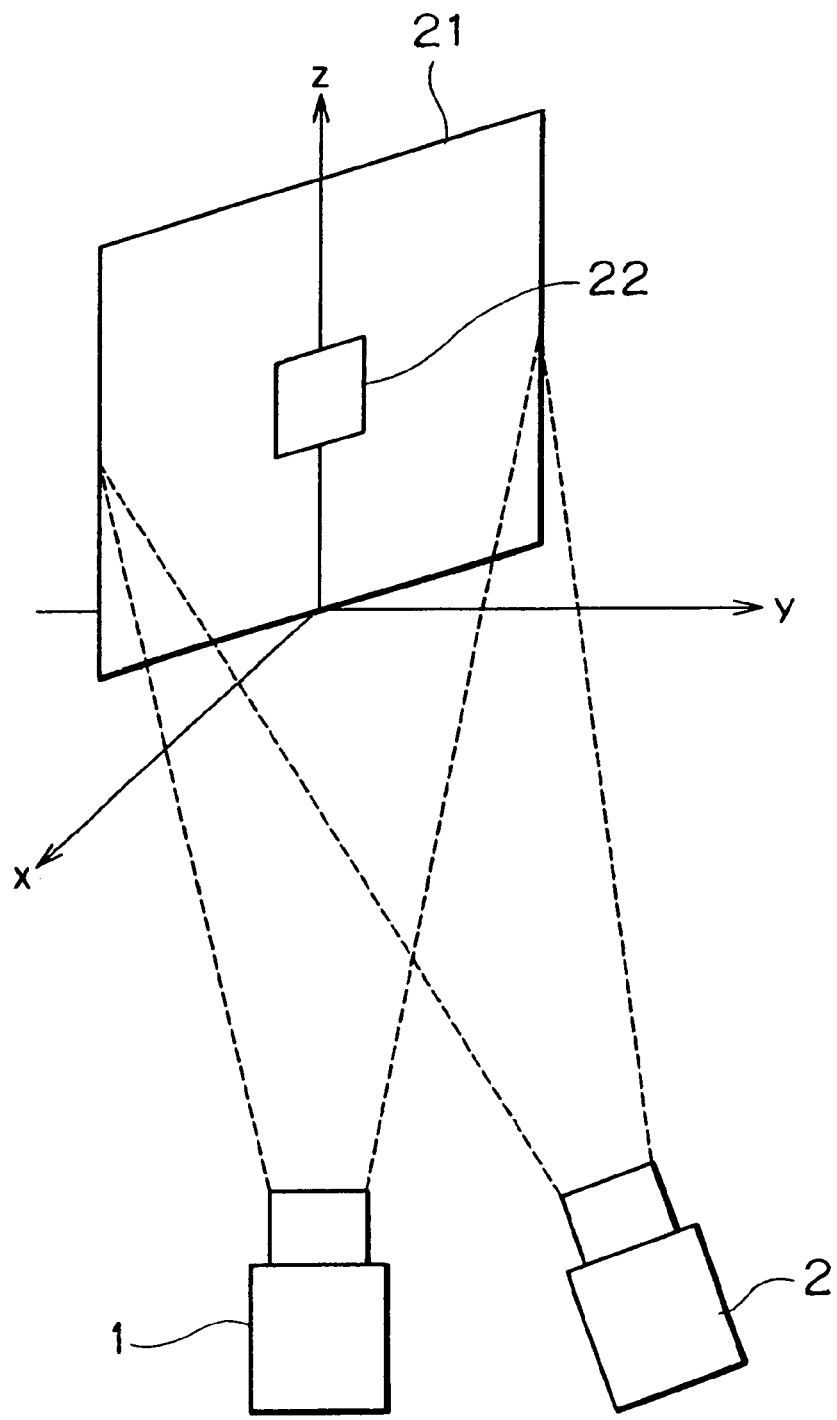
FIG. 3 is a diagrammatic view illustrating matching between a base camera and a reference camera in which the stereo method is used.
Figure 4C:
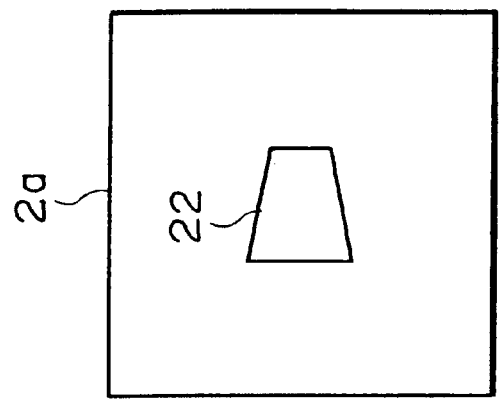
FIGS. 4A to 4C are diagrammatic views illustrating images which are observed by the cameras shown in FIG. 3.
Figure 4B:
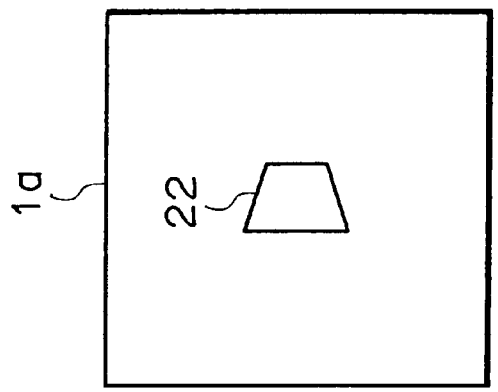
Figure 4A:
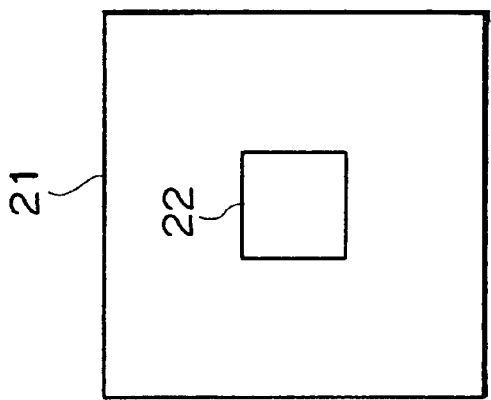

Referring to FIG. 5, there is illustrated a principle wherein, when an object pattern is observed from two cameras (a base camera 1 and a reference camera 2), a plurality of deformed templates 31-1, 31-2, 31-3, . . . are produced based on a predetermined small area (template 12) of a base image a and template matching of the deformed templates 31-1, 31-2, 31-3, . . . with reference images $2a_1$, to $2a_s$ obtained by dividing an image, which is obtained by projection transforming a reference image $2a$ using a parameter determined by camera calibration, into s portions in the depthwise direction. The template 12 is set from the base image $1a$ observed by the base camera 1, and the template 12 thus set is deformed.

For example, in the example of FIG. 5, a template 12 formed from totaling 81 pixels arranged in 9 rows×9 columns (hereinafter referred to simply and suitably as 9×9) is transformed into seven deformed templates 31-1 to 31-7 of 3×9, 5×9, 7×9, 9×9, 11×9, 13×9, and 15×9 (for simplified illustration, the deformed templates 31-4 to 31-7 are omitted in FIG. 5). Then, template matching is performed on an epipolar line 13 (not shown) of the reference images $2a_1$ to $2a_s$ using the deformed templates 31-1 to 31-7 (a particular example of such template matching is hereinafter described).

It is to be noted that details of the principle of producing the s reference images $2a_1$ to $2a_s$ in the depthwise direction by projection conversion from the camera calibration and the single reference image $2a$ are disclosed, for example, in Japanese Patent Laid-Open No. Hei 11-53548 or No. Hei 11-53549.

Subsequently, a construction of an image processing apparatus to which the present invention is applied is described with reference to FIG. 6. A base camera 1 and n reference cameras 2-1 to 2-n (in the following description, where there is no necessity of individually distinguishing them from each other, they are referred to simply as reference cameras 2. This similarly applies to other apparatus described herein.) disposed at visual points different from that of the base camera 1 simultaneously pick up an image of a texture pattern 22, and covert thus picked up observed images (base image $1a$ and reference images $2a$-1 to $2a$-n) into electric signals.

The image processing apparatus 41 is formed from, for example, a personal computer and executes predetermined processing for image signals inputted thereto from the base camera 1 and the reference cameras 2-1 to 2-n. An image memory 51 stores the image signal inputted thereto from the base camera 1, and image memories 52-1 to 52-n store the image signals inputted thereto from the reference cameras 2-1 to 2-n, respectively.

A template setting section 53 determines an arbitrary noticed point 11 from within the base image $1a$ stored in the image memory 51, sets a local area (template 12) around the noticed point 11, and inputs the template 12 into a template deformation section 55. The template deformation section 55 produces a plurality of deformed templates 31-1 to 31-4, for example, by linear interpolation based on a shape of the template 12 inputted thereto, and inputs the deformed templates 31-1 to 31-r to matching operation sections 54-1 to 54-n, respectively.

The matching operation sections 54-1 to 54-n perform template matching on the epipolar line 13 using those of the reference images $2a$-1 to $2a$-n stored in the image memories 52-1 to 52-n which are on the epipolar line 13 and the deformed templates 31-1 to 31-r inputted from the template deformation section 55. Selection sections 56-1 to 56-n determine that one of the deformed templates 31-1 to 31-r which exhibits the highest similarity degree based on a result of the template matching and store the determined deformed template into a memory not shown. Further, the selection sections 56-1 to 56-n determine the coordinate position which exhibits the highest similarity degree as a parallax and inputs the coordinate values into a distance image operation section 57. The distance image operation section 57 arithmetically operates a distance value (depth) from the coordinate values inputted thereto and further produces an image based on the coordinated values inputted thereto and the deformed templates 31 stored in the memory.

Figure 7:
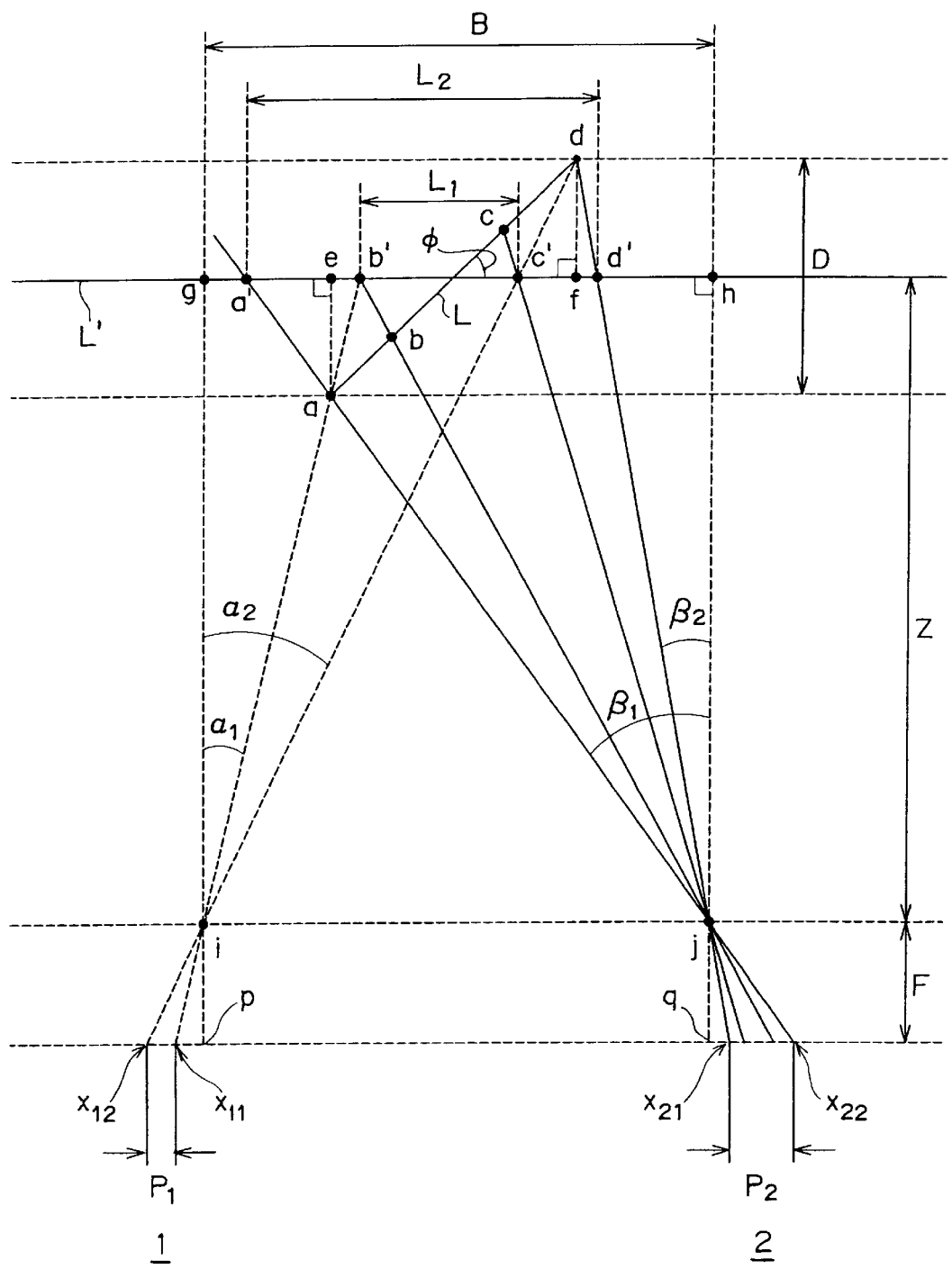
FIG. 7 is a diagrammatic view illustrating a principle in which the shape of an observed image is deformed depending upon the visual point of a camera.

Subsequently, before operation of the image processing apparatus is described, a general principle in accordance with which images observed by the left and right cameras are deformed is described. FIG. 7 illustrates a principle wherein, when the base camera 1 and a reference camera 2 are disposed in a horizontal direction and a line segment L on an oblique plane is observed from the base camera 1 and the reference camera 2, the shapes of the observed images vary depending upon the visual points. The base camera 1 and the reference camera 2 disposed on the left and the right observe the line segment L on the oblique plane placed in the three-dimensional space. In this instance, when four points a, b, c and d on the line segment L are observed from the reference camera 2, they are projected at points a', b', c' and d', respectively, of a line segment L' parallel to a straight line interconnecting the base camera 1 and the reference camera 2. Further, a visual point i of the base camera 1 and a visual point j of the reference camera 2 which observe the line segments L and L' are disposed on the same plane as the line segments L and L'.

As can be seen from FIG. 7, the length $P_1$ of the line segment L on the base image $1a$ observed by the base camera 1 and the length $P_2$ of the line segment L on the reference image $2a$ observed by the reference camera 2 are not necessarily equal to each other. Here, the focal length of the lenses of the base camera 1 and the reference camera 2 is represented by F, the distance between the base camera 1 and the reference camera 2 (the distance is referred to as distance of the base line) by gh(ij)=B, and the distance in a straight line from the visual points i and j of the left and right cameras to the line segment L by Z. Further, if it is assumed that the line segment L imaged by the base camera 1 is projected as a line segment b'c'=$L_1$ on the line segment L' and the line segment L imaged by the reference camera 2 is projected as a line segment a'd'=$L_2$ on the line segment L', then the difference $P_1$–$P_2$ between the two images of the base image $a$ observed by the base camera 1 and the reference image $2a$ observed by the reference camera 2 can be arithmetically operated in accordance with the following expression (2):

$$P_2 - P_1 = (F/Z) \cdot (L_2 - L_1) \tag{2}$$

Here, by substituting eb'=$\Delta L_1$, a'e=$\Delta L_2$, c'f=$\Delta L_3$ and fd'=$\Delta L_4$ into the expression (2) it can be represented as follows:

$$P_2 - P_1 = (F/Z) \cdot (\Delta L_1 + \Delta L_2 + \Delta L_3 + \Delta L_4) \tag{3}$$

Further, by placing gib'=$\alpha_1$, gic'=$\alpha_2$, a'jh=$\beta_1$ and d'jh=$\beta_2$, $\Delta L_1$ to $\Delta L_4$ are represented by the following expressions (4) to (7), respectively:

$$\Delta L_1 = (D/2) \cdot \tan \alpha_1 \tag{4}$$

$$\Delta L_2 = \frac{D}{2} \cdot \tan \beta_1 = \frac{D}{2} \cdot \frac{B - \left(Z - \frac{D}{2}\right) \cdot \tan \alpha_1}{\left(Z - \frac{D}{2}\right)} \tag{5}$$

$$\Delta L_3 = (D/2) \cdot \tan \alpha_2 \tag{6}$$

$$\Delta L_4 = \frac{D}{2} \cdot \tan\beta_2 = \frac{D}{2} \cdot \frac{B - \left(Z + \frac{D}{2}\right) \cdot \tan\alpha_2}{\left(Z + \frac{D}{2}\right)} \quad (7)$$

where D is the distance between the point a and the point d in the depthwise direction.

Further, $\tan\alpha_1$ and $\tan\alpha_2$ can be represented by the following expressions (8) and (9), respectively:

$$\tan\alpha_1 = x_{11}/F \quad (8)$$

$$\tan\alpha_2 = x_{12}/F \quad (9)$$

where $x_{11}$ is the distance from an intersecting point p between a normal line from the point i to the base image 1a and the base image 1a to an intersecting point between a straight line interconnecting the point a and the point i and the base image 1a, and $x_{12}$ is the distance from the intersecting point p to an intersecting point between a straight line interconnecting the point d and the point i and the base image 1a.

Accordingly, by substituting the expressions (4) to (9) into the expression (3), the following expression (10) can be obtained:

$$P_2 - P_1 = (F/Z) \cdot \{(4ZDB)/(4Z^2 - D^2)\} \quad (10)$$

The difference $P_2 - P_1$ between the two images of the base image 1a observed by the base camera 1 and the reference image 2a observed by the reference camera 2 can be determined in this manner.

The unit of the difference $P_2 - P_1$ determined in accordance with the expression (10) above is, for example, mm. Here, if it is assumed that the number of pixels of the base image 1a in the horizontal direction is m (pixels) and the length of a CCD chip in each of the base camera 1 and the reference camera 2 in the horizontal direction is k (mm), then the difference $(P_2 - P_1)_p$ in pixel number between the two images of the base image 1a observed by the base camera 1 and the reference image 2a observed by the reference camera 2 can be determined in accordance with the following expression (11):

$$(P_2 - P_1)_p = \{4(FDB)/(4Z^2 - D^2)\}(m/k) \quad (11)$$

Further, the depth (distance value) D of the line segment L relates to an angle 100 of the line segment L and can be represented by the following expression (12):

$$D = L \cdot \sin\phi \quad (12)$$

FIG. 8 illustrates a result of arithmetic operation of the difference $(P_2 - P_1)_p$ in pixel number in accordance with the expression (11) given above where the line segment L is observed and template matching is performed on the epipolar line 13 of the reference image 2a. Here, the focal length of the lens is F=8 (mm), the distance B between the cameras is B=80 (mm), the distance Z from the visual points i and j of the cameras to the line segment L is Z=500 (mm), the pixel number m of the base image a is m=720 (pixels), and the length k of the CCD chips in the horizontal direction is k=4.8 (mm). Further, the window sizes of the template 12 are 3×3, 5×5, 7×7, 9×9, 11×11, 13×13, 15×15, 17×17 and 19×19.

For example, where the angle $\phi$ of the line segment L is 15 degrees, if the size of the template 12 used is 3×3, then the difference $(P_2 - P_1)_p$ in pixel number is 0.132 (pixels), but if the size of the template 12 used is 9×9, then the difference $(P_2 - P_1)_p$ in pixel number is 0.395 (pixels). Further, if the size of the template 12 used is 15×15, then the difference $(P_2 - P_1)_p$ in pixel number is 0.659 (pixels).

On the other hand, for example, where the angle $\phi$ is 45 degrees, if the size of the template 12 used is 5×5, then the difference $(P_2 - P_1)_p$ in pixel number is 0.875 (pixels), but if the size of the template 12 used is 11×11, then the difference $(P_2 - P_1)_p$ in pixel number is 1.93 (pixels). Further, if the size of the template 12 used is 17×17, then the difference $(P_2 - P_1)_p$ in pixel number is 2.99 (pixels).

Furthermore, for example, where the angle $\phi$ is 75 degrees, if the size of the template 12 used is 7×7, then the difference $(P_2 - P_1)_p$ in pixel number is 6.164 (pixels), but if the size of the template 12 used is 13×13, then the difference $(P_2 - P_1)_p$ in pixel number is 11.607 (pixels). Further, if the size of the template 12 used is 19×19, then the difference $(P_2 - P_1)_p$ in pixel number is 17.204 (pixels).

As can be seen from the results given above, although the same object (line segment L) is observed, the length of the line segment on the image is different depending upon the size of the template 12 and the angle $\phi$ of the line segment L. Accordingly, when template matching is performed for the reference image 2a observed by the reference camera 2, which is at a different visual point from that of the base camera 1, using a single template 12 which has an equal aspect ratio, or when template matching is performed observing a line segment L which has a large angle $\phi$ (that is, when the depth is comparatively great), a correct distance value cannot always be obtained.

Therefore, in the present invention, in order to obtain a correct distance value, a template 12 is set from the base image 1a observed by the base camera 1, and a plurality of deformed templates 31 are produced from the template 12, and then the deformed templates 31 are used to perform template matching with an image of the epipolar line 13 of the reference image 2a.

Figure 9:
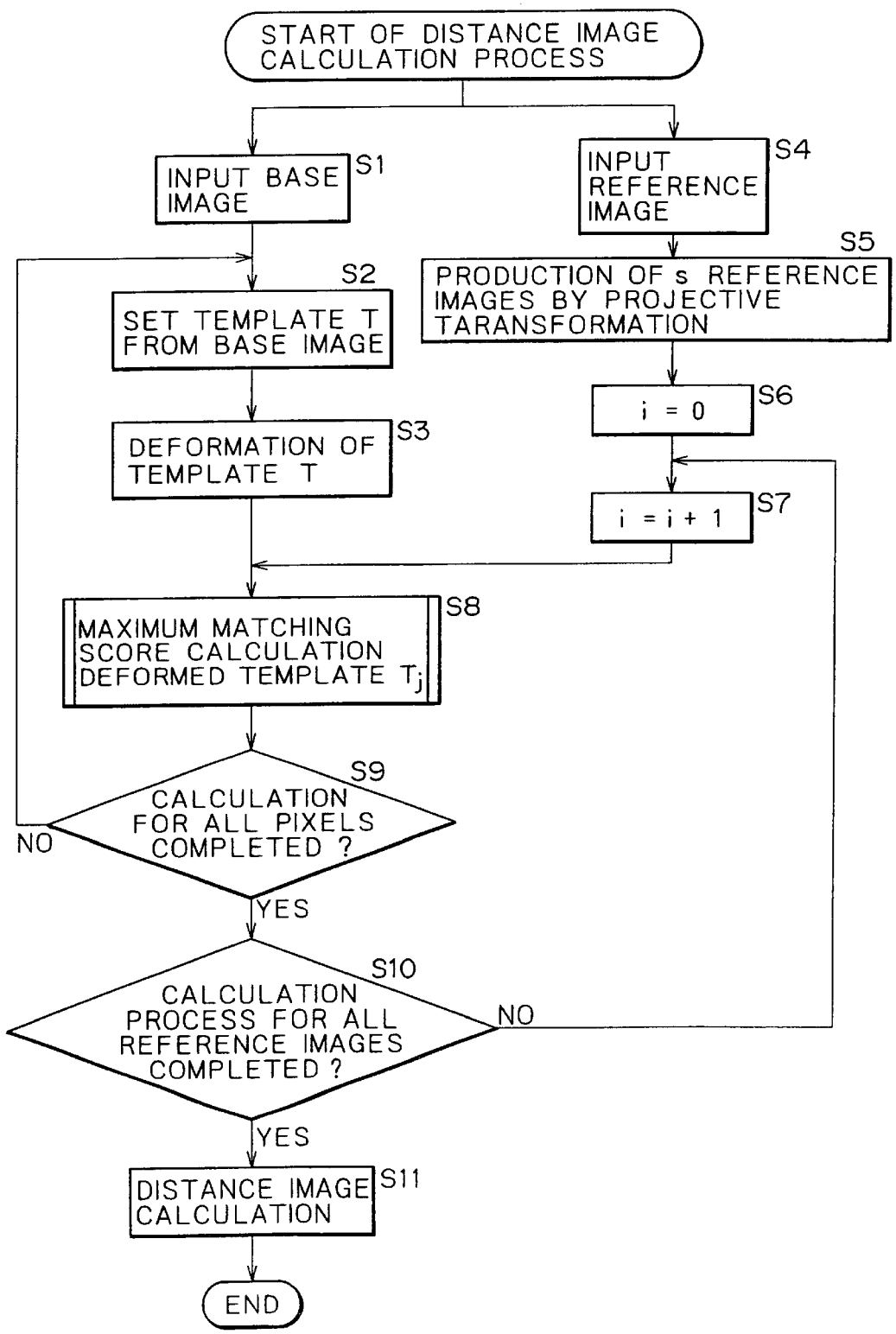
FIG. 9 is a flowchart illustrating operation of the image processing apparatus of FIG. 6.

Now, operation of the image processing apparatus when it performs a distance image calculation process of images observed by different cameras is described with reference to a flowchart of FIG. 9. In step S1, the base camera 1 inputs pixels of the observed base image 1a as Im1(x, y) to the image memory 51 so that they may be stored. In step S2, the template setting section 53 determines an arbitrary noticed point 11 from among the pixels Im1(x, y) of the base image 1a stored in the image memory 51 and sets a template T(x, y) around the noticed point 11.

In step S3, the template deformation section 55 deforms the template T(x, y) set in step S2 by linear interpolation to produce deformed templates $T_j$ (j=1, 2, . . . , J). For example, as seen from FIGS. 10A and 10B, the size and the shape of the template T(x, y) composed of totaling 81 pixels arranged in 9 rows×9 columns (in the following, suitably represented simply as 9×9) are deformed in an arbitrary direction. Particularly, FIG. 10A shows deformed templates $T_1$ to $T_7$ obtained by horizontal deformation of the template T(x, y) of 9×9 to seven different sizes of 9×3, 9×5, 9×7, 9×9, 9×11, 9×13 and 9×15 by linear interpolation. In FIG. 10, J=7.

The template T(x, y) may alternatively be deformed in a vertical direction (y direction). In this instance, for example, seven different deformed templates $Y_1$ to $Y_7$ of sizes of 3×9, 5×9, 7×9, 9×9, 11×9, 13×9 and 15×9 are produced as shown in FIG. 10B.

Referring back to FIG. 9, processing in steps S4 to S7 is performed in parallel to the processing in steps S1, S2 and S3. In step S4, the reference camera 2-1 inputs pixels Im2 (x, y) of the reference image 2a-1 observed thereby to the image memory 52-1. In step S5, the matching operation section 54-1 performs projection conversion of the reference image 2a-1 using a parameter determined from a camera calibration to divide the reference image 2a-1 into s portions in the depthwise direction to produce reference images $2a_1$ to $2a_s$.

In step S6, a variable i is initialized to 0. In step S7, the variable i is incremented by 1. Consequently, in this instance, the variable 1 is updated to i=1.

In step S8, the matching operation section 54-1 performs template matching on the epipolar line 13 using the pixels $Im2_i(x_i, y_i)$ of the ith (now, i=1) reference image $2a_i$ and the deformed templates $T_j$ produced in step S3 to calculate a maximum matching score.

Figure 11:
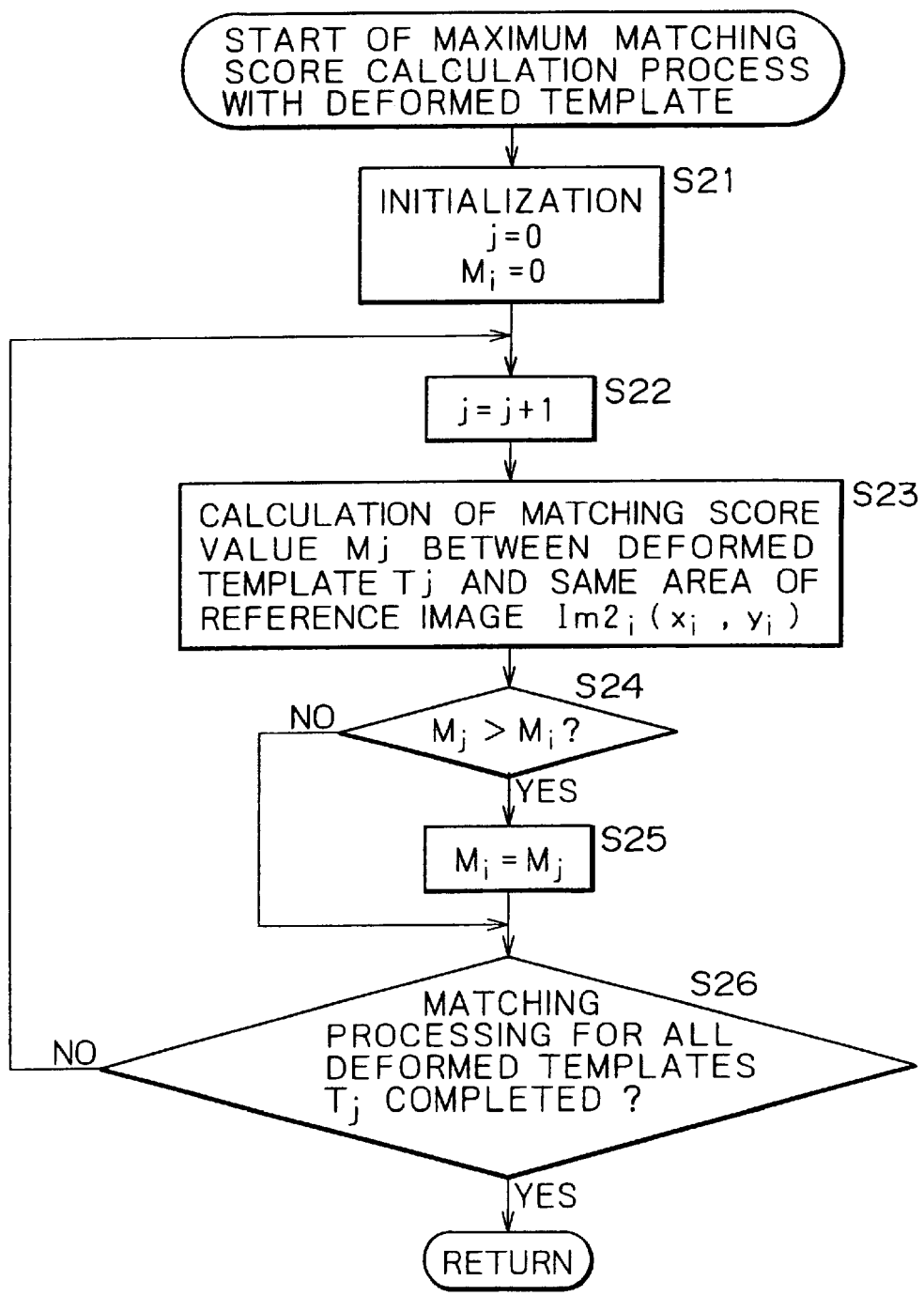
FIG. 11 is a flowchart illustrating a maximum matching score calculation process in step S8 of FIG. 9.

Here, a maximum matching score calculation process wherein the deformed templates $T_j$ of the matching operation section 54-1 are used is described with reference to FIG. 11. In step S21, a variable j for the deformed templates $T_j$ and a maximum matching score value $M_i$ are initialized to 0. In step S22, the variable j is incremented by 1. Consequently, in this instance, the variable j is updated to j=1.

In step S23, the matching operation section 54-1 calculates a matching score value $M_j$ between the deformed templates $T_j$ (j=1) deformed by the template deformation section 55 and the same area around the pixel $Im2_i(x_i, y_i)$ of the ith (i=1) reference image 2a. The matching score value $M_j$ has a value which increases as the correlation between the template and the reference image increases, and is determined, for example, as a reciprocal value to the coincidence degree R(x, y) determined in accordance with the expression (1) given hereinabove.

In step S24, the matching operation section 54-1 discriminates whether or not the matching score value $M_j$ calculated in step S23 is higher than the maximum matching score value $M_i$ stored in the memory. If it is discriminated that the matching score value $M_j$ is higher than the maximum matching score value $M_i$ (now, $M_i=0$), then the processing advances to step S25, in which the matching operation section 54-1 substitutes the matching score value $M_j$ into the maximum matching score value $M_i$, whereafter the processing advance to step S26. On the other hand, if it is discriminated in step S24 that the matching score value $M_j$ is equal to or lower than the maximum matching score value $M_i$, then the process in step S25 is skipped, and the processing advances directly to step S26.

In step S26, the matching operation section 54-1 discriminates whether or not the matching processing with the pixel $Im2_i(x_i, y_i)$ of the ith reference image $2a_i$ is completed using all deformed templates $T_j$. If it is discriminated that the matching processing is not completed, then the processing returns to step S22, in which the value of the variable j is incremented by one. Consequently, in this instance, the visual point j is updated to j=2. Consequently, the second deformed template is selected, and thereafter, similar processing is repeated using the second deformed template.

The processing described above is repeated until it is discriminated in step S26 that the matching processing with the pixel $Im2_i(x_i, y_i)$ of the ith reference image $2a_i$ is completed using all deformed templates $T_j$.

Referring back to FIG. 9, the matching operation section 54-1 discriminates in step S9 whether or not the calculation processing of a maximum matching score with all of the pixels $Im2_i(x_i, y_i)$ of the ith reference image $2a_i$ is completed. If it is discriminated that the calculation processing is not completed, then the processing returns to step S2. Then, the processing described above is repeated until it is discriminated in step S9 that the calculation processing of a maximum matching score with all of the pixels $Im2_i(x_i, y_i)$ of the ith reference image $2a_i$ is completed.

If it is discriminated in step S9 that the calculation processing of a maximum matching score with all of the pixels $Im2_i(x_i, y_i)$ of the ith reference image $2a_i$ is completed, then the matching operation section 54-1 further discriminates in step S10 whether or not matching processing with all of the reference images $2a_1$ to $2a_s$ is completed. If it is discriminated that the matching processing is not completed, then the processing returns to step S7, in which the value of the variable i is incremented by one. Now, the variable i is updated to i=2. Thereafter, the processing advances to step S8, in which similar processing is repeated until it is discriminated in step S10 that matching processing with all of the reference images $2a_1$ to $2a_s$ is completed.

Then, if it is discriminated in step S10 that matching processing with all of the reference images $2a_1$ to $2a_s$ is completed, then the selection section 56-1 determines the deformed template $T_j$ which exhibits the highest similarity degree (that is, which exhibits the highest value among the maximum matching score values $M_i$) from the maximum matching score values $M_i$, and stores the deformed template $T_j$ into the memory not shown. Further, the selection section 56-1 inputs the pixel Im2(x, y) of the reference image 2a-1 when the similarity degree is in the highest, and inputs it to the distance image operation section 57.

FIG. 12 illustrates a result of calculation of the maximum matching score value $M_i$ using the deformed templates $T_j$ by such a maximum matching score calculation process as described above. Referring to FIG. 12, the axis of abscissa represents the deformed templates $T_j$ and the axis of ordinate represents the similarity degree. For example, in FIG. 12, since the deformed template $T_6$ exhibits the highest similarity degree, the deformed template $T_6$ is stored into the memory, and the pixels Im2(x, y) of the reference image 2a-1 then are inputted to the distance image operation section 57.

Referring back to FIG. 9, in step S11, the distance image operation section 57 determines the amounts of movement of the deformed template when the maximum matching score value $M_i$ is obtained as a parallax between the noticed pixels, and produces a distance image in accordance with the principle of triangulation, thereby ending the processing.

In the foregoing description, a method of deforming a template into deformed templates $T_j$ of a rectangular shape. However, the present invention can be applied also where a template is deformed into deformed templates of some other shape such as, for example, a trapezoidal shape. Further, while the expression (11) is used as a reference for determination of an aspect ratio of the template 12, it is otherwise possible to use the following expression (13):

$$P_2 - P_1 = \frac{L \cdot \sin\phi(x_{11} + x_{12} + x_{21} + x_{22})}{Z} \cdot \frac{m}{k} \quad (13)$$

$$= \frac{4FLB \cdot \sin\phi}{4Z^2 - L^2 \cdot \sin^2\phi} \cdot \frac{m}{k}$$

Further, in addition to determination of the difference $P_1-P_2$ between the images of the base image 1a observed by the base camera 1 and the reference image 2a observed by the reference camera 2, it is possible to determine an aspect ratio by determining a ratio $P_1/P_2$ between the images in accordance with the following expression (14):

$$P_2/P_1 = \frac{2F\cos\phi + (x_{21} + x_{22})\sin\phi}{2F\cos\phi - (x_{11} + x_{12})\sin\phi} \qquad (14)$$

$$= \frac{2F + (x_{21} + x_{22})\tan\phi}{2F - (x_{11} + x_{12})\tan\phi}$$

As described above, since a plurality of deformed templates 31 (including the original template 12) are produced from the template 12 and template matching is performed using the deformed templates, the ambiguity in matching between images can be reduced and the frequency in occurrence of mismatching can be suppressed considerably, and consequently, a distance value having a high degree of reliability can be obtained.

Accordingly, a distance value can be measured with a high degree of accuracy also for an object which is complicated in shape particularly in the depthwise direction of a complicated three-dimensional shape.

The series of processes described above may be executed by hardware or by software. Where the series of processes is executed by software, a program which constructs the software is installed into a computer incorporated in the image processing apparatus 41 as hardware for exclusive use or, for example, a personal computer for universal use which can execute various functions by installing various programs.

Now, a medium on which the program for execution of the series of processes described above is recorded and which is used to install the program into a computer so that the program may be executed by the computer is described with reference to FIGS. 13A to 13C taking a case wherein the computer is a personal computer for universal use as an example.

Figure 13A:
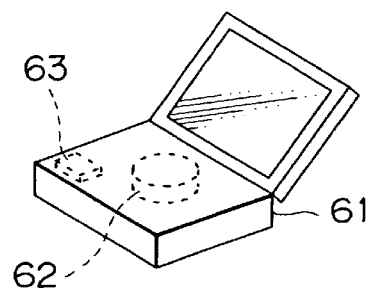
FIGS. 13A to 13C are diagrammatic views illustrating various media.
Figure 13B:
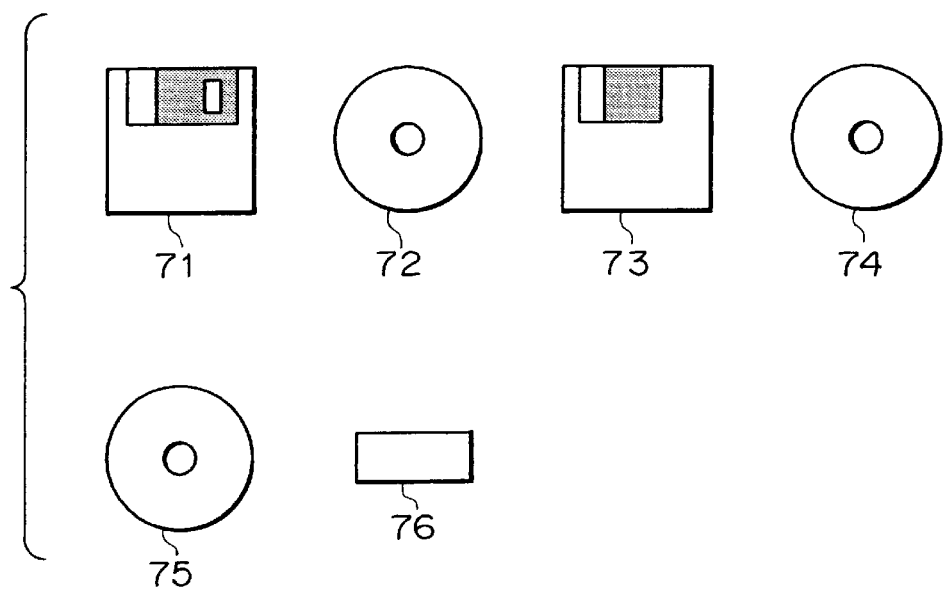
Figure 13C:
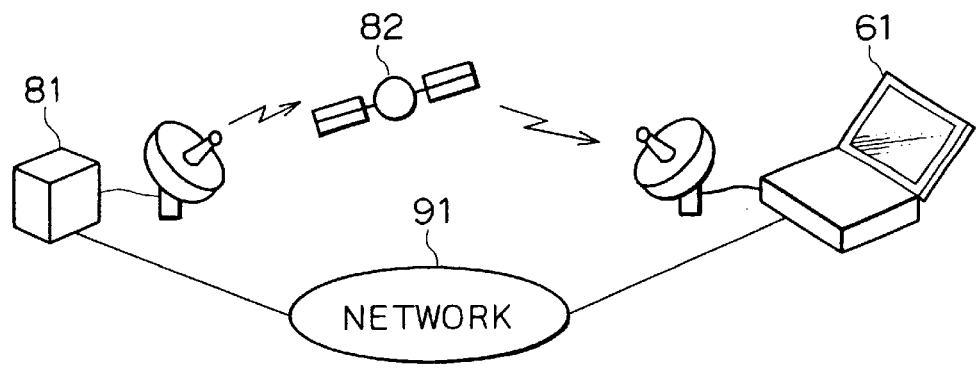

The program can be provided to a user in such a form that it is installed in advance in a hard disk 62 or a semiconductor memory 63 as a recording medium built in a personal computer 61 as shown in FIG. 13A.

As an alternative, the program may be provided as package software by temporarily or permanently storing (recording) it on such a recording medium as a floppy disk 71, a CD-ROM (Compact Disc Read Only Memory) 72, an MO (Magneto-optical) disk 73, a DVD (Digital Versatile Disc) 74, a magnetic disk 75 or a semiconductor memory 76.

As another alternative, the program may be transferred by radio to the personal computer 61 from a down load site 81 through an artificial satellite 82 for digital satellite broadcasting, or may be transferred by radio or by wire to the personal computer 61 over a network 91 such as a local area network or the Internet and then installed into the built-in hard disk 62 by the computer 61.

It is to be noted that the term "medium" in the present specification is used to signify in a broad sense including all such media as mentioned hereinabove.

Figure 14:
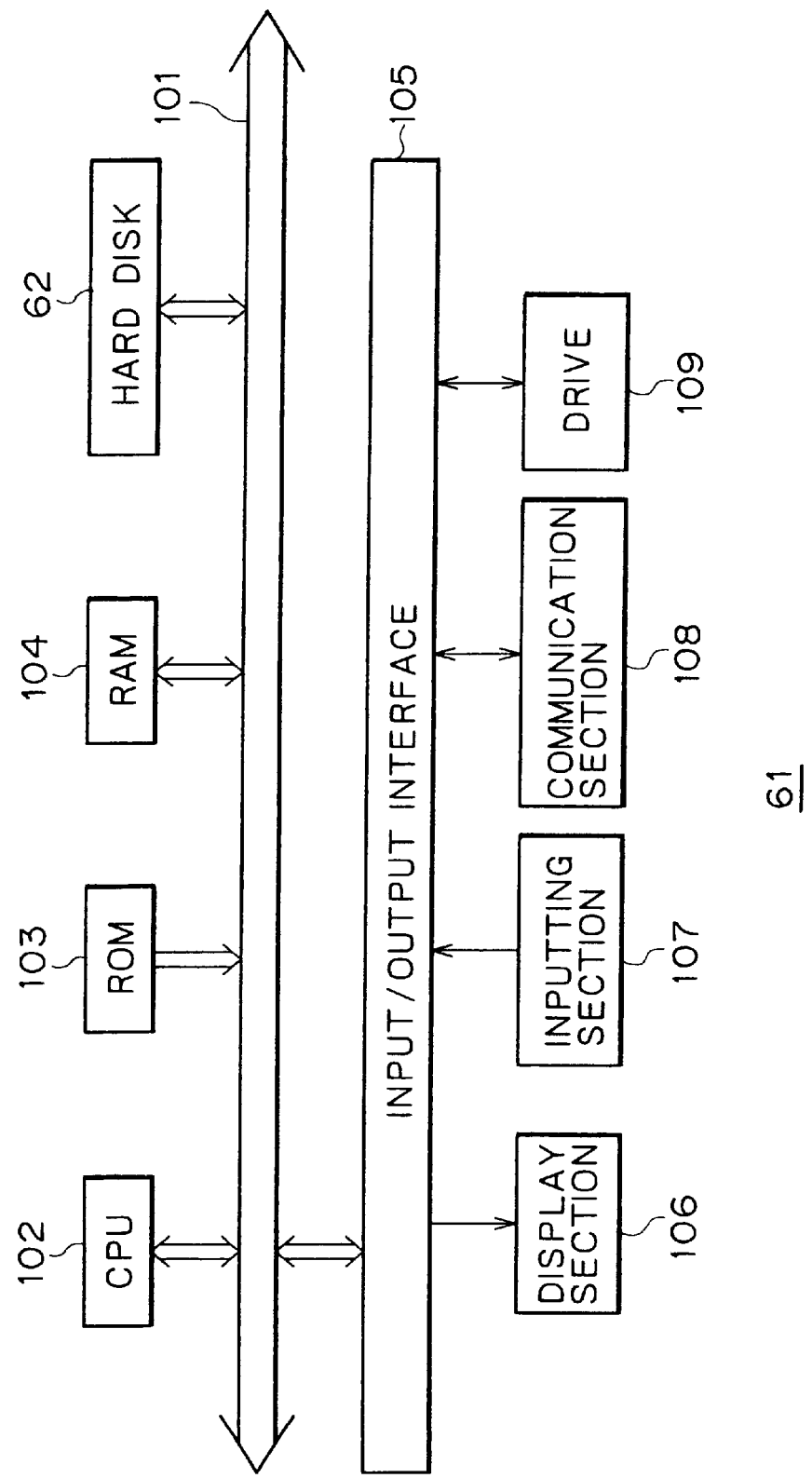
FIG. 14 is a block diagram showing a construction of a personal computer shown in FIG. 13A.

Referring to FIG. 14, for example, the personal computer 61 has a CPU 102 built therein. An input/output interface 105 is connected to the CPU 102 over a bus 101. If a user operates an inputting section 107 which is formed from a keyboard, a mouse or the like to input an instruction to the CPU 102 through the input/output interface 105, then the CPU 102 executes a program stored in a ROM 103, which corresponds to the semiconductor memory 63 of FIG. 13A, in response to the instruction. Or, the CPU 102 loads into a RAM 104 and executes a program stored in advance on the hard disk 62, a program transferred from the satellite 82 or the network 91, received by a communication section 108 and then installed on the hard disk 62 or a program read out from the floppy disk 71, CD-ROM 72, MO disk 73, DVD 74 or magnetic disk 75 loaded on a drive 109 and installed on the hard disk 62. Further, the CPU 102 outputs, when necessary, a result of the processing, for example, to a display unit 106, which is formed from an LCD (Liquid Crystal Display) unit or the like, through the input/output interface 105.

It is to be noted that, in the present application, the steps which describe the program provided in the form of a medium may be but need not necessarily be processed in a time series in the order as described, and include processes which are executed parallelly or individually.

While a preferred embodiment of the present invention has been described using specific terms, such description is for illustrative purposes only, and it is to be understood that changes and variations may be made without departing from the spirit or scope of the following claims.

What is claimed is:

1. An image processing apparatus, comprising:
   first inputting means for inputting an image picked up by a base image pickup apparatus as a base image;
   second inputting means for inputting at least one image picked up by at least one reference image pickup apparatus disposed at a different visual point from the base image pickup apparatus as a reference image or images;
   setting means for setting an arbitrary object pixel and peripheral pixels around the object pixel from among pixels of the base image as a template;
   production means for producing a plurality of deformed templates via linear interpolation based on a shape of the template set by said setting means; and
   calculation means for determining a corresponding point or points of the reference image or images on an associated epipolar line using the deformed templates to calculate a corresponding relationship of the reference image or images to the base image, wherein said calculation means calculates similarity degrees of the deformed templates at pixels of the reference image or images and extracts and sets a coordinate point which exhibits a highest correlation from among the calculated similarity degrees as a corresponding point.

2. An image processing apparatus according to claim 1, wherein said production means varies an aspect ratio of the template to produce the plurality of deformed templates.

3. An image processing method, comprising:
   a first inputting step of inputting an image picked up by a base image pickup apparatus as a base image;
   a second inputting step of inputting at least one image picked up by at least one reference image pickup apparatus disposed at a different visual point from the base image pickup apparatus as a reference image or images;
   a setting step of setting an arbitrary object pixel and peripheral pixels around the object pixel from among pixels of the base image as a template;
   a production step of producing a plurality of deformed templates via linear interpolation based on a shape of the template set by the processing in the setting step; and
   a calculation step of determining a corresponding point or points of the reference image or images on an associated epipolar line using the deformed templates to calculate a corresponding relationship of the reference image or images to the base image, wherein the calculation step calculates similarity degrees of the deformed templates at pixels of the reference image or images and extracts and sets a coordinate point which exhibits a highest correlation from among the calculated similarity degrees as a corresponding point.

4. An image processing method according to claims 3, wherein the production step varies an aspect ratio of the template to produce the plurality of deformed templates.

5. A medium for causing a computer to execute a program which includes:

a first inputting step of inputting an image picked up by a base image pickup apparatus as a base image;

a second inputting step of inputting at least one image picked up by at least one reference image pickup apparatus disposed at a different visual point from the base image pickup apparatus as a reference image or images;

a setting step of setting an arbitrary object pixel and peripheral pixels around the object pixel from among pixels of the base image as a template;

a production step of producing a plurality of deformed templates via linear interpolation based on a shape of the template set by the processing in the setting step; and a calculation step of determining a corresponding point or points of the reference image or images using the deformed templates to calculate a corresponding relationship of the reference image or images to the base image, wherein the calculation step calculates similarity degrees of the deformed templates at pixels of the reference image or images and extracts and sets a coordinate point which exhibits a highest correlation from among the calculated similarity degrees as a corresponding point.

6. A medium for causing a computer to execute a program according to claim 5, wherein the production step varies an aspect ratio of the template to produce the plurality of deformed templates.

* * * * *